G. C. SCHNEIDER.
Cutting Screw Threads.
No. 17,522.
Patented June 9, 1857.
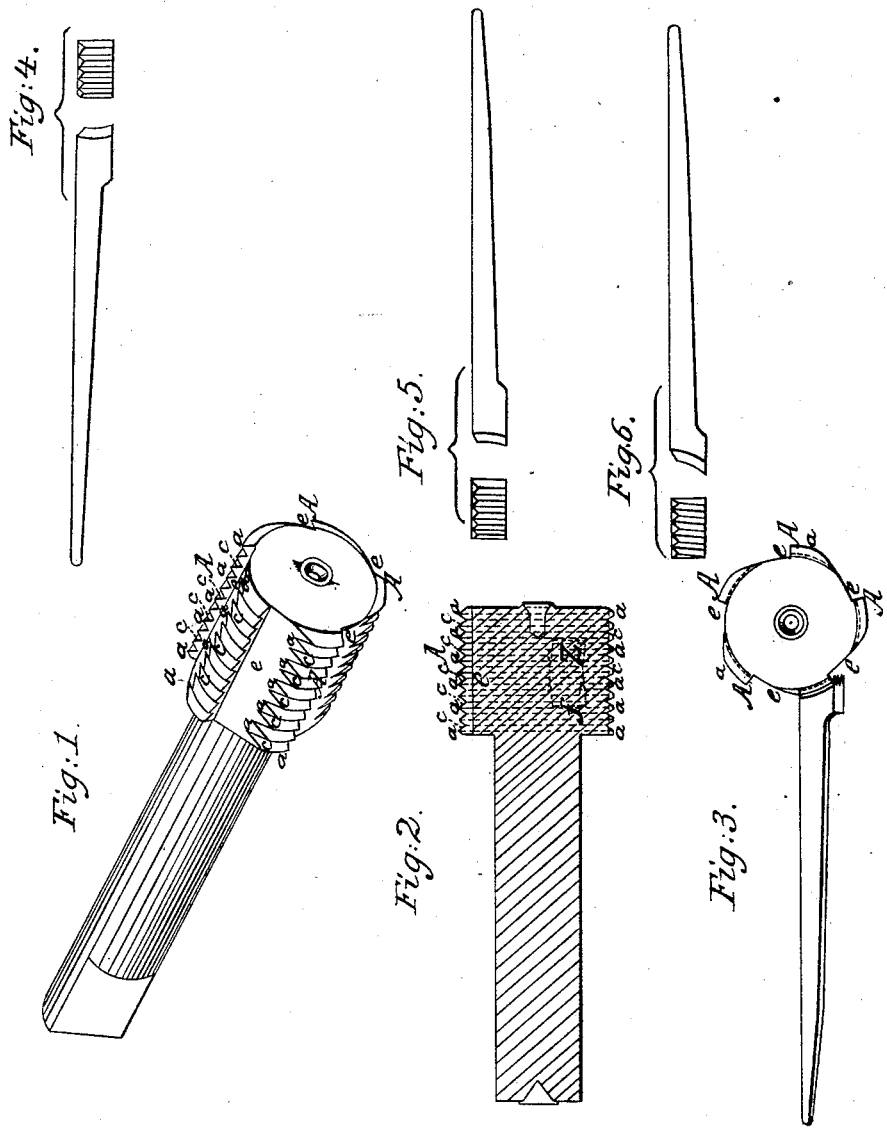

UNITED STATES PATENT OFFICE.

G. C. SCHNEIDER, OF WASHINGTON, DISTRICT OF COLUMBIA.

HOB FOR CUTTING SCREW-CHASERS.

Specification of Letters Patent No. 17,522, dated June 9, 1857.

*To all whom it may concern:*

Be it known that I, GOTTLOB C. SCHNEIDER, of Washington city, in the District of Columbia, have invented a new and useful Improvement in Hobs for Cutting the Threads of Screw-Chasers, of which the following is a full, clear, and exact description, reference being had to the accompanying drawing, forming part of this specification, and in which—

Figure 1 represents a view in perspective of my improved hob, which is adapted to cutting chasers for either right or left hand screws. Fig. 2, represents a longitudinal section of the hob with end views (X and Z) seen through it, of two chaser blanks that show the reverse inclinations at which the blanks are held for cutting grooves in them suitable for chasing right or left screw threads. The parallel dotted lines on the hob at right angles to its axis, represent the parallel ridges and grooves for cutting the grooves and teeth in the chaser blanks. Fig. 3, represents an elevation of the end of the hob and the side of the chaser being cut thereon. Fig. 4, represents side and face views of a chaser for cutting a left hand screw, and Fig. 5 similar views of a right hand chaser both adapted to cutting single threaded screws, and Fig. 6, represents like views of a chaser adapted to cutting double threaded screws.

The hob in general use for cutting screw chasers is a cylindrical screw cutter grooved longitudinally. The objections to this hob are, that from the inclination of the cutting thread, the same hob is not adapted to cut both right and left chasers; and, that the rapidity of forming chasers with it is limited by the time occupied in traversing the blank during the process of cutting from end to end, withdrawing it from one end and bringing it up to the hob at the other, and also the liability of forming imperfect chasers by not bringing the blank each time with accuracy up to the hob.

The object of my invention is to improve the hob for threading screw chasers so as to increase the facility and rapidity of threading such chasers, and to diminish the liability to form imperfect ones; and also to adapt the same hob to cutting both right and left hand chasers, and my invention for the accomplishment of these objects consists in forming the threads or teeth of the hob by making a series of equidistant ridges on the periphery of a cylinder, parallel to each other and to planes at right angles to the axis of the cylinder, instead of forming the threads, as heretofore, of a series of segments of a helical ridge.

My improved ring hob is shown in the accompanying drawing, and consists of a cylinder whose periphery is grooved with annular grooves perpendicular to its axis and at equal distances apart, by which the surface of the cylinder is formed into a series of annular ridges ($a$) and furrows ($c$) whose outline and distance apart vary according to the pitch and shape of the thread required in the chasers. The cylinder should be channeled in a direction either parallel or but slightly inclined to its axis; and one side of the channels ($e$) should be parallel or thereabout to the radii of the cylinder in order to form cutting edges (A) on the ends of the sections into which the ridges are divided by these channels.

In cutting chasers with this hob, which it is most convenient to mount in a lathe and to hold the chaser-blank in a suitable clamp in such a position that it is inclined transversely to the axis of the hob, the inclination being either to the right or left (see Fig. 2) as a right or left hand chaser is to be cut. The degree of inclination to be given to the blank will, as in the case of the common chaser, depend upon the pitch and the diameter of the screws for which the chaser is cut. The blank is gradually fed up to the hob in a direction at right angles to its axis, until the grooves and ridges are cut to the depth required. Thus at one operation and without being removed from or traversed on the hob the chaser is completed.

The increased rapidity with which chasers can be cut with this hob, the diminished liability to form imperfect chasers; and its capability of cutting with equal facility both right and left chasers, give it great advantages over the screw hob.

For the purpose of cutting double or treble threads the inclination at which the chasers are presented transversely to the axis of the hob must be suitably increased beyond that which is required for cutting a single-thread screw.

Having thus described my invention what I claim and desire to secure by Letters Patent is—

The hob for cutting the threads of screw chasers constructed in the manner described.

In testimony whereof, I have hereunto subscribed my name.

G. C. SCHNEIDER.

In presence of—
Wm. D. Baldwin,
Henry Baldwin, Jr.